United States Patent
Kurihara et al.

(10) Patent No.: US 10,122,881 B2
(45) Date of Patent: Nov. 6, 2018

(54) CONTROL DEVICE AND PRINTING APPARATUS

(71) Applicant: FUJI XEROX CO., LTD., Tokyo (JP)

(72) Inventors: Yusaku Kurihara, Kanagawa (JP); Tsubasa Kitai, Kanagawa (JP); Satoshi Watanabe, Kanagawa (JP); Noriaki Tanaka, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 15/260,869

(22) Filed: Sep. 9, 2016

(65) Prior Publication Data

US 2017/0289379 A1 Oct. 5, 2017

(30) Foreign Application Priority Data

Mar. 29, 2016 (JP) ................ 2016-065118

(51) Int. Cl.
- *H04N 1/00* (2006.01)
- *G06F 3/12* (2006.01)
- *G06K 15/02* (2006.01)
- *H04N 1/23* (2006.01)

(52) U.S. Cl.
CPC ..... *H04N 1/00917* (2013.01); *H04N 1/00832* (2013.01); *H04N 1/2376* (2013.01)

(58) Field of Classification Search
None
See application file for complete search history.

(56) References Cited

U.S. PATENT DOCUMENTS

| | | | | |
|---|---|---|---|---|
| 7,450,928 | B1* | 11/2008 | Henry, Jr. | G06Q 30/0239 379/114.15 |
| 8,107,094 | B2 | 1/2012 | Yamada | |
| 2002/0140964 | A1* | 10/2002 | Goto | G06K 15/00 358/1.14 |
| 2003/0069802 | A1* | 4/2003 | Ramsey-Catan | G06Q 20/04 705/26.35 |
| 2005/0058487 | A1* | 3/2005 | Utsubo | G06Q 20/102 400/76 |
| 2008/0100860 | A1* | 5/2008 | Yamada | H04N 1/00832 358/1.13 |
| 2011/0051180 | A1* | 3/2011 | Sasagawa | G06F 3/1222 358/1.15 |

(Continued)

FOREIGN PATENT DOCUMENTS

| | | | |
|---|---|---|---|
| JP | 2008-116562 | 5/2008 | |
| JP | 2015-176533 | * 10/2015 | ............... G06F 3/12 |

*Primary Examiner* — Beniyam Menberu
(74) *Attorney, Agent, or Firm* — Fildes & Outland, P.C.

(57) ABSTRACT

A control device includes: a prohibition unit that prohibits a user from using an electronic apparatus in a case where a sum of a cumulative usage amount of the electronic apparatus by the user for a predetermined period and a new usage amount which is newly instructed by the user exceeds a permitted amount for the user in the period; a subtraction unit that, in a case where the user instructs the electronic apparatus to be continuously used after the use of the electronic apparatus is prohibited by the prohibition unit, subtracts from permitted amounts for the user for a plurality of periods later than the period; and a permission unit that permits the user to use the electronic apparatus after the subtraction is performed by the subtraction unit.

12 Claims, 4 Drawing Sheets

(56) References Cited

U.S. PATENT DOCUMENTS

| | | | | |
|---|---|---|---|---|
| 2011/0125363 A1* | 5/2011 | Blumer | ............... | G06Q 30/06 |
| | | | | 701/31.4 |
| 2011/0188073 A1* | 8/2011 | Akutsu | ............... | G06F 15/00 |
| | | | | 358/1.15 |
| 2013/0059595 A1* | 3/2013 | Okubo | ............ | H04W 28/0268 |
| | | | | 455/452.1 |
| 2014/0244459 A1* | 8/2014 | Webb | ............... | G06Q 30/04 |
| | | | | 705/34 |

* cited by examiner

| N | 1 | 2 | 3 | 4 | 5 | 6 | 7 | 8 | 9 | 10 | 11 | 12 |
|---|---|---|---|---|---|---|---|---|---|----|----|----|
| NUMBER OF SHEETS PERMITTED | 300 | 300 | 300 | 300 | 300 | 300 | 300 | 300 | 300 | 300 | 300 | 300 |

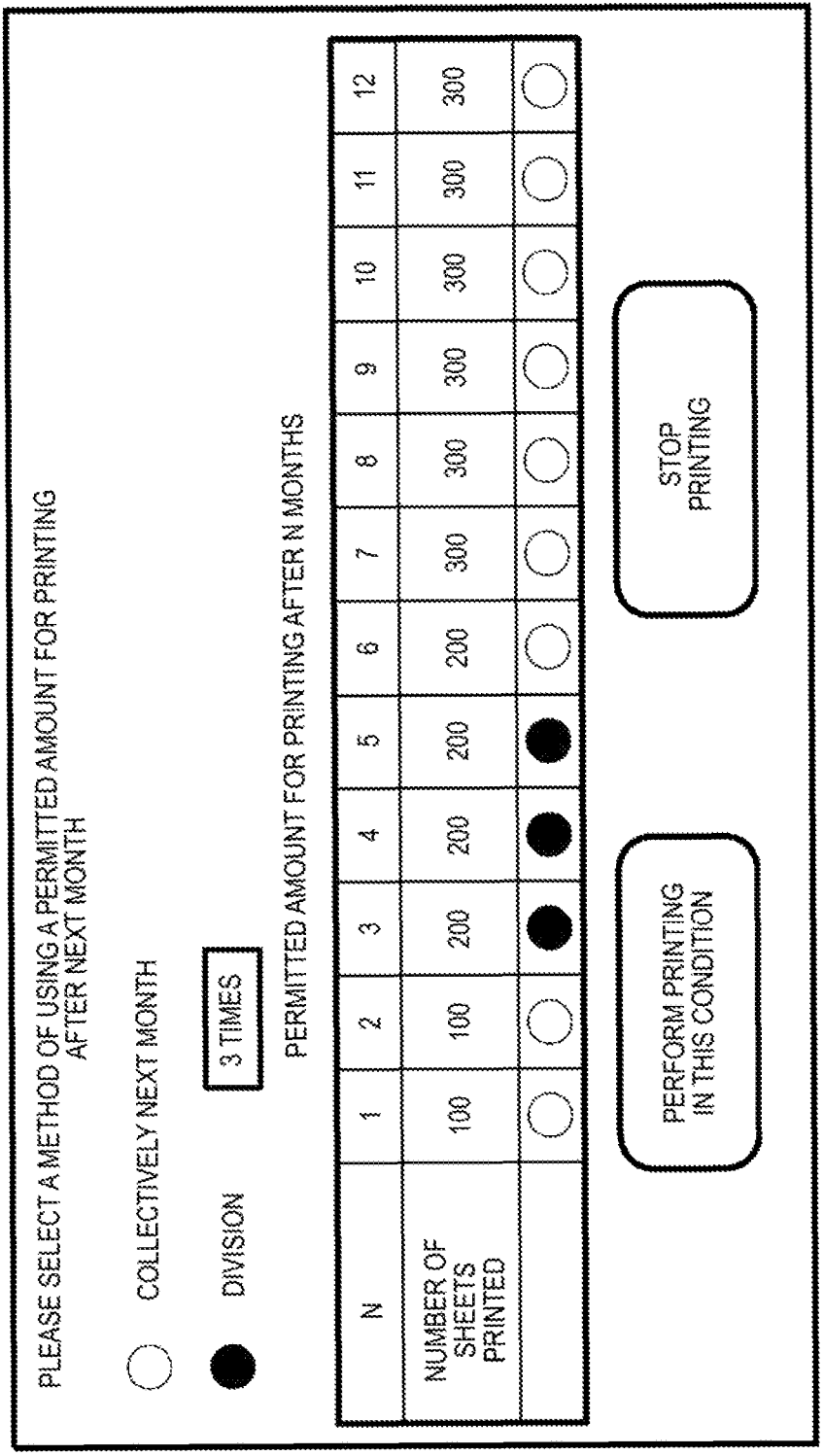

CONTROL DEVICE AND PRINTING APPARATUS

CROSS-REFERENCE TO RELATED APPLICATIONS

This application is based on and claims priority under 35 USC 119 from Japanese Patent Application No. 2016-065118 filed on Mar. 29, 2016.

BACKGROUND

Technical Field

The present invention relates to a control device and a printing apparatus.

SUMMARY

According to an aspect of the invention, there is provided a control device including: a prohibition unit that prohibits a user from using an electronic apparatus in a case where a sum of a cumulative usage amount of the electronic apparatus by the user for a predetermined period and a new usage amount which is newly instructed by the user exceeds a permitted amount for the user in the period; a subtraction unit that, in a case where the user instructs the electronic apparatus to be continuously used after the use of the electronic apparatus is prohibited by the prohibition unit, subtracts from permitted amounts for the user for a plurality of periods later than the period; and a permission unit that permits the user to use the electronic apparatus after the subtraction is performed by the subtraction unit.

BRIEF DESCRIPTION OF THE DRAWINGS

Exemplary embodiments of the present invention will be described in detail based on the following figures, wherein:

FIG. 6 is a diagram showing a screen for designating a period of time for which a permitted amount is subtracted.

DETAILED DESCRIPTION

Figures 1, 2:
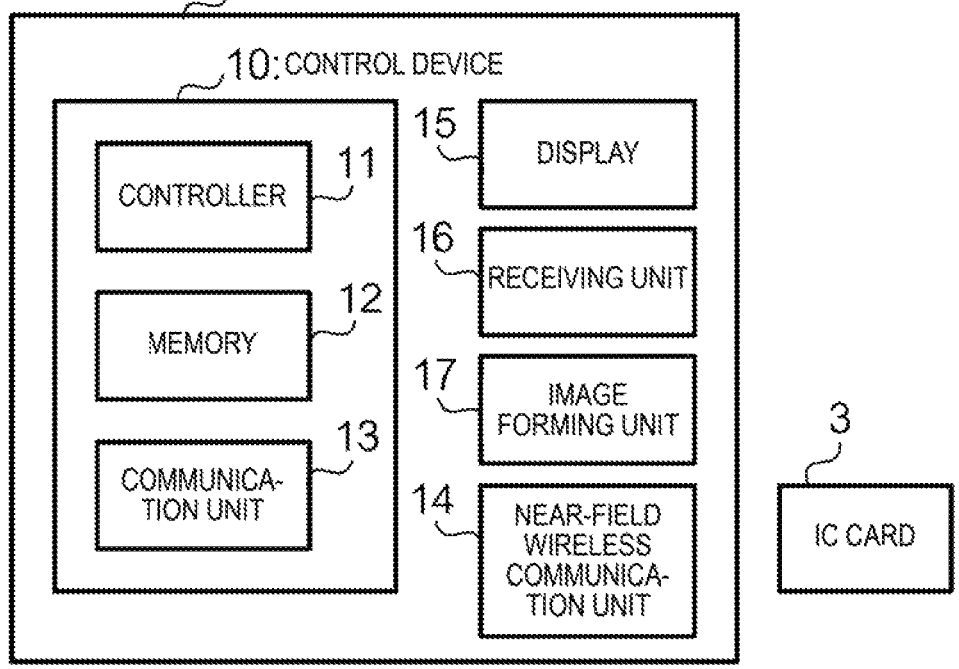
FIG. 1 is a diagram showing a hardware configuration of a printing apparatus.
FIG. 2 is a diagram showing a permitted amount table.

An example of a mode for implementing the invention will now be described. FIG. 1 is a diagram showing a hardware configuration of a printing apparatus 1. The printing apparatus 1 is an example of electronic apparatus according to the invention. The printing apparatus 1 prints out an image based on printing data. A control device 10 includes a controller 11, a memory 12, and a communication unit 13, and controls the printing apparatus 1. The control device 10 may be configured as an external device of the printing apparatus 1, and the control device 10 and the printing apparatus 1 may be configured to communicate with each other through a communication unit.

The controller 11 includes an arithmetic operation device such as a Central Processing Unit (CPU) and a storage device such as a Read Only Memory (ROM) or a Random Access Memory (RAM). The ROM stores hardware or firmware in which the procedure of the start-up of an Operating System (OS) is described. The RAM stores data when the CPU executes an arithmetic operation. The memory 12 includes, for example, a hard disk storage device, and stores an OS, application programs, and the like. The communication unit 13 is a communication interface (I/F) for connecting the printing apparatus 1 to a Local Area Network (LAN).

The short range wireless communication unit 14 is a reader-writer that performs communication with, for example, a non-contact type integrated circuit (IC) card 3. The IC card 3 stores a user ID that identifies a user account of the printing apparatus 1. The near-field wireless communication unit 14 periodically transmits an inquiry signal.

When an operator holds up the IC card 3 over the printing apparatus 1, the IC card 3 receives the inquiry signal.

The IC card 3 transmits a user ID to the near-field wireless communication unit 14 in response to the reception of the inquiry signal. A user ID of a user given the user account of the printing apparatus 1 is stored in the memory 12 in advance. The controller 11 permits the use of the printing apparatus 1 in a case where the user ID received by the short range wireless communication unit 14 is stored in the memory 12.

In general, there are a case where an individual uses one user ID and a case where plural individuals included in a group share one user ID, but a user in the following description is a unit related to the amount of use of the printing apparatus 1 and means an individual or a group which is associated with the user ID. On the other hand, a person who operates the printing apparatus 1 is referred to as an operator.

The display 15 is, for example, a liquid crystal display, and displays a screen for operating the printing apparatus 1. The receiving unit 16 is, for example, a touch panel provided so as to cover a display surface of the display 15, and receives an operation with respect to the printing apparatus 1.

The image loaning unit 17 forms an image on a recording medium based an raster data. The recording medium is, for example, a printing sheet (hereinafter, referred to as a sheet). The configuration of the image forming unit 17 may be any configuration such as an electrophotograpbic system or an inkjet type. The memory 12 stores a cumulative amount of use indicating the number of sheets used for printing. The controller 11 adds the number of sheets used for printing to a cumulative amount of use every time printing is performed. In addition, the controller 11 initializes a cumulative amount of use to zero at a point in time when a mouth in a calendar changes. In other words, the cumulative amount of use is the number of sheets printed this month.

FIG. 2 is a diagram showing a permitted amount table. The permitted amount table is a table in which a permitted amount for each period of time is stored for each user ID. The wording "permitted amount" as used herein refers to the number of sheets which is permitted for printing. In this example, the length of the period of time is one month. N (1, 2, . . . , 12) indicates the number of months after this month.

For example, N=1 indicates after one month. In this example, 300 sheets are permitted to be used every month.

Figure 3:
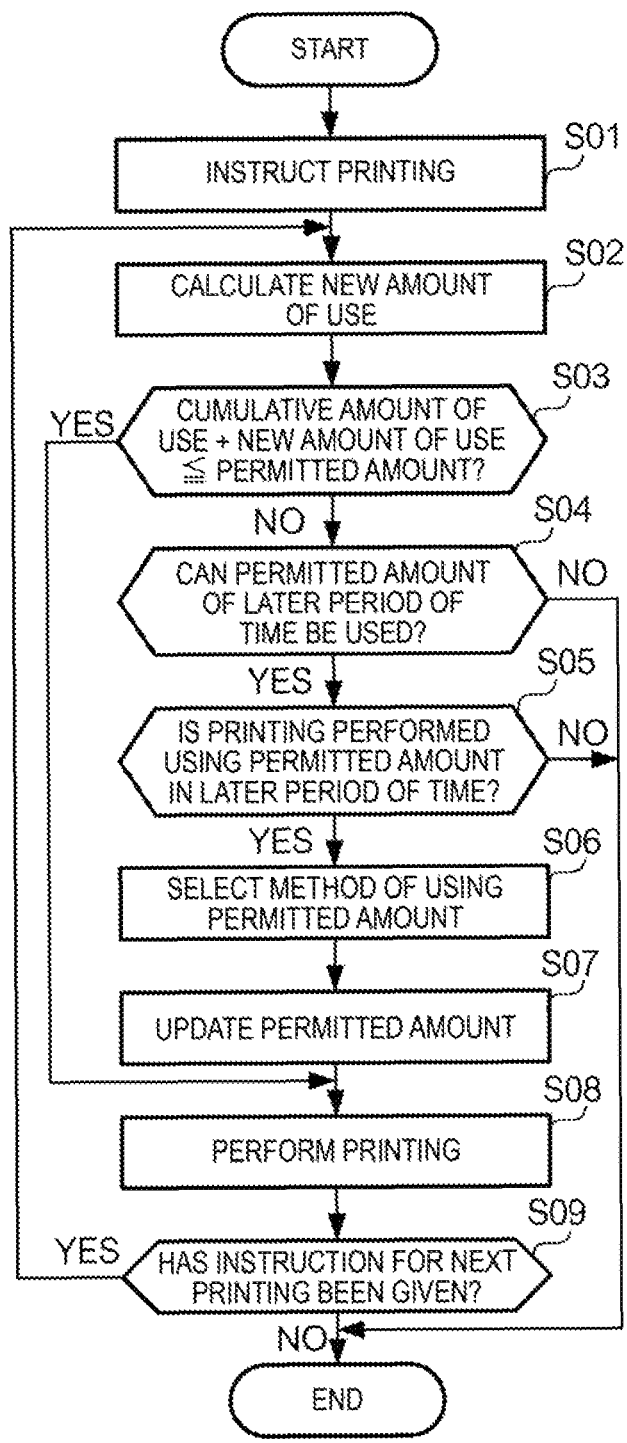
FIG. 3 is a flow chart showing the procedure of a process according to an exemplary embodiment.

FIG. 3 is a flow chart showing the procedure of a process according to an exemplary embodiment. The controller 11 of the printing apparatus 1 performs the following process in accordance with an application program installed in the printing apparatus 1.

Step S01

The controller 11 receives a print instruction. For example, an operator gives an instruction for copying to the receiving unit 16, and the instruction is output to the controller 11.

Step S02

The controller 11 calculates a new amount of use. Specifically, the controller 11 calculates the number of sheets used (new amount of use) based on the print instruction.

Step S03

The controller 11 reads out the cumulative amount of use from the memory 12, and determines whether or not the sum of the cumulative amount of use and the new amount of use is equal to or less than a permitted amount of this month. In a case where the sum of the cumulative amount of use and the new amount of use is equal to or less than the permitted amount of this month (step S03: YES), the process of the controller 11 proceeds to step S08. In a case where the sum of the cumulative amount of use and the new amount of use is not equal to or less than the permitted amount of this month (step S03: NO), the process of the controller 11 proceeds to step S04.

Step S04

The controller 11 determines whether printing can be performed in accordance with a print instruction. Specifically, the controller 11 calculates an additional amount of use by the following expression. Additional amount of use=(cumulative amount of use+new amount of use)−permitted amount of this month Next, in a case where a permitted amount capable of printing with an additional amount of use remains with reference to the permitted amount table (step S04: YES) of the controller 11, the process of the controller 11 proceeds to step S05. In a case where a permitted amount capable of printing with an additional amount of use does not remain (step S04: NO), the controller 11 terminates the process.

Step S05

Figure 4:
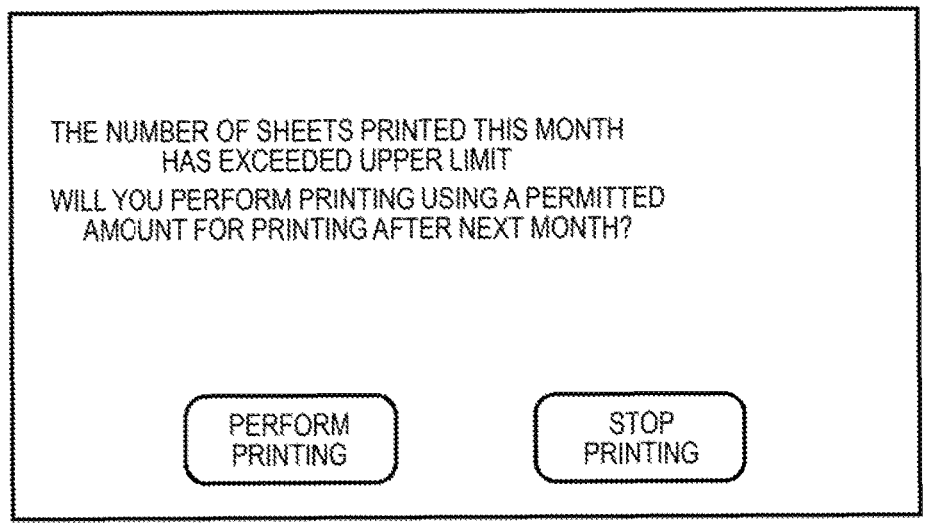
FIG. 4 is a diagram showing a screen for selecting either execution or stop of printing.

FIG. 4 is a diagram showing a screen for selecting either execution or stop of printing. The controller 11 displays the screen on the display 15 to make an operator select either execution or stop of printing. In a case where the operator selects the execution of printing (step S05: YES), the process of the controller 11 proceeds to step S06. In a case where the operator selects the stop of printing (step S05: NO), the controller 11 terminates the process.

Step S06

Figure 5:
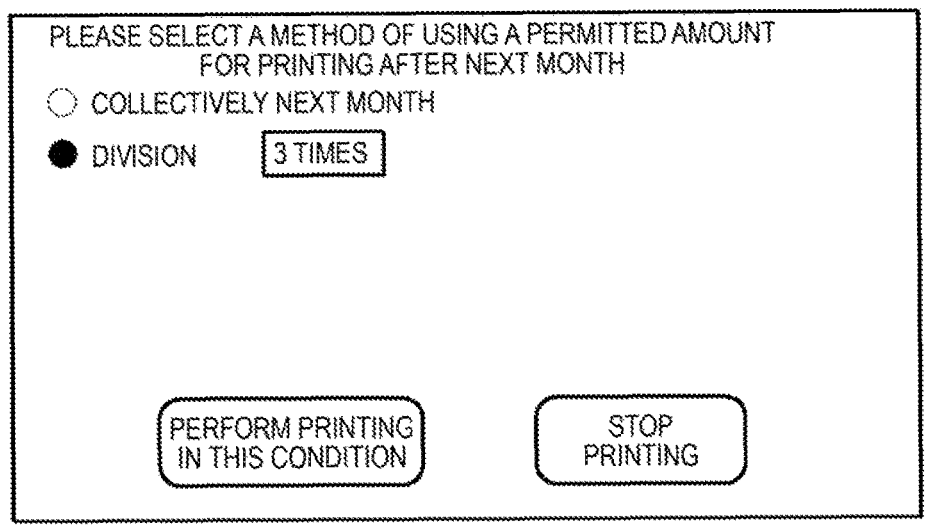
FIG. 5 is a diagram showing a screen for selecting a method of using a permitted amount in a later period of time.

FIG. 5 is a diagram showing a screen for selecting a method of using a permitted amount in a later period of time. The controller 11 displays the screen on the display 15 to makes an operator select a method of using a permitted amount in a later period of time. In this example, two methods of "collectively next month" and "division" can be selected. The wording "collectively next month" as used herein refers to use by only a permitted amount of the next month. The term "division" as used herein refers to use by permitted amounts of plural months after the next month. In this example, any of the above-mentioned two methods is selected using a radio button. In addition, in a case where "division" is selected, the number of times of division is designated by inputting the number of times (twice or more) to a text box.

Step S07

The controller 11 updates a permitted amount. Specifically, the controller 11 subtracts an additional amount of use from a permitted amount in a later period of time. For example, in a case where an additional amount of use is 100 and "collectively next month" is selected, the controller 11 updates a permitted amount for month=1 of the permitted amount table to 200. On, the other hand, in a case where "division" (twice) is selected, the controller 11 updates permitted amounts for month=1 and 2 of the permitted amount table to 250.

Step S08

The controller 11 outputs raster data based on a print instruction to the image forming unit 17 and executes printing.

Step S09

The controller 11 determines whether or not the next print instruction is given. In a case where the next print instruction is received (step S09: YES), the process of the controller 11 proceeds to step S02. In a case where the next print instruction is not received (step S09: NO), the controller 11 terminates the process.

As described above, this exemplary embodiment is an example of a control device including a prohibition unit that prohibits a user from using electronic apparatus in a case where the sum of a cumulative amount of use of the electronic apparatus of the user for a determined period of time and a new amount of use which is newly instructed by the user exceeds a permitted amount in the period of time which is permitted for the user, a subtraction unit that subtracts permitted amounts of plural periods of time later than the period of time which is permitted for the user, in a case where the user instructs the electronic apparatus to be continuously used after the use of the electronic apparatus is prohibited by the prohibition unit, and a permission unit that permits the user to use the electronic apparatus after the subtraction is performed by the subtraction unit. According to this exemplary embodiment, influence on the amount of use of the electronic apparatus in a later period of time is suppressed as compared to a configuration in which a permitted amount in one period of time later than the period of time is subtracted instead of using the electronic apparatus in excess of the permitted amount in the period of time.

In addition, in this exemplary embodiment, a receiving unit that receives an instruction for designating the number of plural periods of time is provided, and thus an operator can designate the number of plural periods of time fear which a permitted amount is subtracted.

The above-described exemplary embodiment may be modified as in the following modification example. Plural modification examples may be combined with each other.

First Modification Example

FIG. 6 is a diagram showing a screen for designating a period of time for which a permitted amount is subtracted. In this example, contents of a permitted amount table are displayed, and a radio button for designating a month is provided below the number of sheets of each month. Such a configuration is an example of a receiving unit that accepts the designation of the plural periods of time. In addition, such a configuration is an example of a presentation unit that presents a permitted amount for each period of time which may serve as a target for subtraction performed by the subtraction unit.

In addition, the amount of subtraction for each designated period of time may be designated by an operator. Such a configuration is an example of a configuration in which the receiving unit accepts the designation of the amount of subtraction of a permitted amount for each period of time which may serve as a target for subtraction performed by the subtraction unit.

In addition, it may be allowed that "division" is canceled and "collectively next month" is designated again. Such a configuration is an example of a configuration in which the receiving unit receives an instruction for replacing the plural periods of time with one period of time.

In addition, the number of times of division may be set in advance as an initial setting in a screen shown in FIG. 5 or 6. In addition, a period of time other than the next month may be allowed to be designated as a period of time in the case of a bundle.

Second Modification Example

As the amount of use, the number of pages may be used instead of the number of sheets.

A unit of a period of time may be any length of time such as a weekly unit or a daily unit.

In the exemplary embodiment, a permitted amount table for one year has been described, but a permitted amount table for any length of a period of time may be used. However, there is a concern that the use of a permitted amount for an accounting period later than an accounting period including this month may result in a problem in an accounting process, and thus it is preferable that a permitted amount table includes only a permitted amount within an accounting period including this month.

Third Modification Example

In the exemplary embodiment, a description has been given of an example in which the invention is applied to the management of the amount of use (the number of printed sheets) of a printing apparatus, but the invention may be applied to the management of the amount of use of electronic apparatus other than the printing apparatus, such as the amount of use (the number of read sheets) of an image scanner or the amount of use (the number of transmitted sheets) of a facsimile.

In the exemplary embodiment, a description has been given of an example in which the above-mentioned functions are realized by an application program, but some or all of the above-mentioned functions may be mounted in a hardware circuit. In addition, the application program may be provided by being recorded in a computer readable recording medium such as an optical recording medium or a semiconductor memory, or the program may be read from the recording medium to be installed. In addition, the program may be provided by an electric communication line.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to function as:
   a prohibition unit that prohibits a user from using an electronic apparatus in a case where a sum of a cumulative usage amount of the electronic apparatus by the user for a predetermined period and a new usage amount which is newly instructed by the user exceeds a permitted amount for the user in the period;
   a subtraction unit that, in a case where the user instructs the electronic apparatus to be continuously used after the use of the electronic apparatus is prohibited by the prohibition unit, divides an additional amount of use into portions, the additional amount of use being the sum of the cumulative usage amount by the user for the period and the new usage amount less the permitted amount for the user in the period, the number of portions being a number of a plurality of periods later than the period, each portion corresponding to a unique one of the plurality of periods later than the period, and subtracts each corresponding portion from a permitted amount for the user for the respective unique one of the plurality of periods later than the period; and
   a permission unit that permits the user to use the electronic apparatus after the subtraction is performed by the subtraction unit.

2. The non-transitory computer readable medium according to claim 1, wherein the program further causes the computer to function as:
   a receiving unit that accepts designation of a number of the plurality of periods.

3. The non-transitory computer readable medium according to claim 2,
   wherein the receiving unit receives an instruction for replacing the plurality of periods with one period as a target for the subtraction performed by the subtraction unit.

4. The non-transitory computer readable medium according to claim 1, wherein the program further causes the computer to function as:
   a receiving unit that accepts designation of the plurality of periods.

5. The non-transitory computer readable medium according to claim 4, wherein the program further causes the computer to function as:
   a presentation unit that presents a permitted amount for each period which may serve as a target for the subtraction performed by the subtraction unit.

6. The non-transitory computer readable medium according to claim 5,
   wherein the receiving unit accepts designation of an amount of subtraction from the permitted amount for each period which may serve as the target for the subtraction performed by the subtraction unit.

7. The non-transitory computer readable medium according to claim 6,
   wherein the receiving unit receives an instruction for replacing the plurality of periods with one period as a target for the subtraction performed by the subtraction unit.

8. The non-transitory computer readable medium according to claim 5,
   wherein the receiving unit receives an instruction for replacing the plurality of periods with one period as a target for the subtraction performed by the subtraction unit.

9. The non-transitory computer readable medium according to claim 4,
   wherein the receiving unit receives an instruction for replacing the plurality of periods with one period as a target for the subtraction performed by the subtraction unit.

10. The non-transitory computer readable medium according to claim 1,
    wherein the subtraction unit divides the additional amount of use into equal portions.

11. A non-transitory computer readable medium storing a program causing a computer to function as:

a prohibition unit that prohibits a user from using a printing apparatus in a case where a sum of a cumulative usage amount of the printing apparatus by the user for a predetermined period and a new usage amount which is newly instructed by the user exceeds a permitted amount for the user in the period;

a subtraction unit that, in a case where the user instructs the printing apparatus to be continuously used after the use of the printing apparatus is prohibited by the prohibition unit, divides an additional amount of use into portions, the additional amount of use being the sum of the cumulative usage amount by the user for the period and the new usage amount less the permitted amount for the user in the period, the number of portions being a number of a plurality of periods later than the period, each portion corresponding to a unique one of the plurality of periods later than the period, and subtracts each corresponding portion from a permitted amount for the user for the respective unique one of the plurality of periods later than the period; and a permission unit that permits the user to use the printing apparatus after the subtraction is performed by the subtraction unit.

12. The non-transitory computer readable medium according to claim 11, wherein the subtraction unit divides the additional amount of use into equal portions.

\* \* \* \* \*